US008665849B2

(12) United States Patent
Jin et al.

(10) Patent No.: US 8,665,849 B2
(45) Date of Patent: Mar. 4, 2014

(54) METHODS AND SYSTEMS FOR IMPLEMENTING INTER-NETWORK ROAM, QUERYING AND ATTACHING NETWORK

(75) Inventors: Youxing Jin, Shenzhen (CN); Tao Fu, Shenzhen (CN); Weibin Wang, Shenzhen (CN)

(73) Assignee: ZTE Corporation, Shenzen, Guangdong (CN)

( * ) Notice: Subject to any disclaimer, the term of this patent is extended or adjusted under 35 U.S.C. 154(b) by 223 days.

(21) Appl. No.: 13/395,495

(22) PCT Filed: Aug. 20, 2010

(86) PCT No.: PCT/CN2010/076204
§ 371 (c)(1),
(2), (4) Date: Mar. 12, 2012

(87) PCT Pub. No.: WO2011/035667
PCT Pub. Date: Mar. 31, 2011

(65) Prior Publication Data
US 2012/0176970 A1 Jul. 12, 2012

(30) Foreign Application Priority Data
Sep. 25, 2009 (CN) .......................... 2009 1 0177841

(51) Int. Cl.
*H04W 4/00* (2009.01)
*H04J 3/24* (2006.01)
*H04L 12/28* (2006.01)
*H04L 12/56* (2011.01)

(52) U.S. Cl.
USPC ........... 370/338; 370/349; 370/389; 370/401; 455/432.1

(58) Field of Classification Search
USPC ......... 370/310–350, 351–356, 389–401, 471, 370/473–475; 455/403–428, 431–449, 455/455–466; 709/230–245
See application file for complete search history.

(56) References Cited

U.S. PATENT DOCUMENTS 6,512,756 B1 * 1/2003 Mustajarvi et al. ........... 370/341
7,821,986 B2 * 10/2010 Thomson et al. ............. 370/328
(Continued)

FOREIGN PATENT DOCUMENTS

| CN | 101119312 A | 2/2008 |
| CN | 101127663 A | 2/2008 |
| CN | 101136866 A | 3/2008 |
| CN | 101212425 A | 7/2008 |

(Continued)

OTHER PUBLICATIONS

International Search Report for PCT/CN2010/076204, English Translation attached to original, Both completed by the Chinese Patent Office on Sep. 14, 2010, All together 6 Pages.

*Primary Examiner* — Tri H Phan
(74) *Attorney, Agent, or Firm* — Brooks Kushman P.C.

(57) ABSTRACT

Methods and systems are disclosed for implementing inter-network roam and for querying and network attachment, applied in a network of access identifier and location identifier separation, wherein the method for implementing inter-network roam comprises: after attaching to an ASN of a roaming area network, a roaming terminal sending a first data packet whose destination address is the AID of a destination device to the destination device; after receiving the first data packet, the ASN querying locally AID-RID mapping information, and requesting a roaming gateway to query the RID of the destination device if the RID is not found and the destination device does not belong to the roaming network; the roaming gateway querying the RID from a home network of the destination device and returning to the ASN; according to the RID, the ASN sending subsequent data packets of the roaming terminal to the destination device.

23 Claims, 3 Drawing Sheets

(56) References Cited

U.S. PATENT DOCUMENTS

| | | | |
|---|---|---|---|
| 7,970,929 B1* | 6/2011 | Mahalingaiah | 709/238 |
| 8,140,074 B2* | 3/2012 | Kellil et al. | 455/436 |
| 2008/0043699 A1* | 2/2008 | Park et al. | 370/342 |

FOREIGN PATENT DOCUMENTS

| | | |
|---|---|---|
| JP | 2006-148203 | 6/2008 |
| KR | 100668660 B1 | 1/2007 |
| WO | 01/67689 | 9/2001 |

* cited by examiner

METHODS AND SYSTEMS FOR IMPLEMENTING INTER-NETWORK ROAM, QUERYING AND ATTACHING NETWORK

CROSS-REFERENCE TO RELATED APPLICATION

This application is the U.S. national phase of PCT Appln. No. PCT/CN2010/076204 filed Aug. 20, 2010 which claims priority to Chinese Application No. 200910177841.9 filed Sep. 25, 2009, the disclosures of which are incorporated in their entirety by reference herein.

TECHNICAL FIELD

The present invention relates to a network of identity identifier and location identifier separation, and in particular, to a method and system for implementing inter-network roam, and a method and system for querying and network attachment.

BACKGROUND

At present, the IP address has dual functions in TCP/IP (Transmission Control Protocol/Internet Protocol) widely used in the Internet, i.e., the IP address serves not only as the location identifier of the communication terminal host network interface of the network layer in the network topology, but also as the access identifier of the host network interface of the transmission layer. The case of host mobility was not taken into consideration when the TCP/IP protocol was initially designed. However, as host mobility becomes more and more popular, the defect of semantics overload of this kind of IP address becomes more and more apparent. When the IP address of a host changes, not only the route but also the access identifier of the communication terminal host will change, resulting in bigger and bigger load of the route. The change of the host identifier will cause interruption of application and connection.

The access identifier and location identifier separation is proposed to aim at solving the problems of semantics overload of the IP address, severe load of the route, security and so on, separating the dual functions of the IP address, realizing support for problems including mobility, multi-homeness, dynamic redistribution of IP addresses, reduction of route load, and inter-visit between different network areas in the next generation of internet.

After a user signs a service agreement with a network B, if the user roams to an area uncovered by the network B (a roaming area), the user cannot be served by the network B, but if the roaming area is an area covered by a network A and network A has signed a roaming agreement with network B, and the user is allowed to roam, then the user can still enjoy the same service in the area covered by network A. However, currently there is still no method for providing services for a roaming user in the network of identity identifier and location identifier separation.

SUMMARY OF THE INVENTION

The technical problem to be solved by the present invention is to provide a method and system for implementing inter-network roam, and a method and system for querying and network attachment to solve the problem that roaming users cannot be provided with services in the network of identity identifier and location identifier separation, and realize that a user may enjoy the same network service when the user moves between different networks of identity identifier and location identifier separation.

In order to solve the above technical problem, the present invention provides a method for implementing inter-network roam, which is applied in a network of access identifier and location identifier separation, wherein, in the network, an access identifier (AID) is used as a user identity identifier of a terminal and a routing identifier (RID) is used as a location identifier of the terminal, and the method comprises:

after attaching to an Access Service Node (ASN) of a roaming area network, a roaming terminal sending a first data packet to a destination device, wherein a destination address of the first data packet is the AID of the destination device;

after receiving the first data packet, the ASN in the roaming area network querying locally AID-RID mapping information, and requesting a roaming gateway to query the RID of the destination device if the RID of the destination device is not found and the destination device does not belong to the roaming area network;

the roaming gateway querying the RID of the destination device from a home network of the destination device and returning the RID of the destination device to the ASN in the roaming area network; and according to the RID of the destination device, the ASN in the roaming area network sending subsequent data packets of the roaming terminal to the destination device.

The step of the ASN of the roaming area network requesting the roaming gateway to query the RID of the destination device comprises: the ASN of the roaming area network sending the AID of the destination device to the roaming gateway to request to query the RID of the destination device;

the step of the roaming gateway querying the RID of the destination device from a home network of the destination device and returning the RID of the destination device to the ASN in the roaming area network comprises:

after receiving the AID of the destination device, the roaming gateway analyzing the AID to acquire the home network of the destination device, and sending the AID of the destination device to a mapping forwarding plane of the home network of the destination device to request to query the RID of the destination device;

after querying out a corresponding RID according to the AID of the destination device, the mapping forwarding plane of the home network of the destination device sending the AID-RID mapping information of the destination device to the roaming gateway, and the roaming gateway storing the AID-RID mapping information and then forwarding to the ASN of the roaming area network.

The step of the roaming terminal attaching to the ASN of the roaming area network comprises:

the roaming terminal requesting attachment to the ASN of the roaming area network, and sending the AID of the roaming terminal to the ASN of the roaming area network;

the ASN of the roaming area network identifying that the roaming terminal does not belong to a local network according to the AID of the roaming terminal, and requesting access to the roaming gateway;

the roaming gateway searching for a home network of the roaming terminal according to the AID of the roaming terminal, and requesting authentication to an authentication center of the home network of the roaming terminal;

the authentication center authenticating the roaming terminal and then informing the roaming gateway of an authentication result; and the roaming gateway informing the ASN of the roaming area network of an access result, and the ASN of the roaming area network informing the roaming terminal of an attachment result.

The step of the ASN in the roaming area network sending subsequent data packets of the roaming terminal to the destination device according to the RID of the destination device comprises:

the ASN in the roaming area network re-encapsulating the data packet of the roaming terminal by using the RID of the destination device and the RID of the roaming terminal as the destination address and the source address of the re-encapsulated data packet respectively, and sending the re-encapsulated data packet to a destination ASN through a media plane channel between the ASN in the roaming area network and the destination ASN; and the destination ASN de-encapsulating the received data packet re-encapsulated by the ASN in the roaming area network, restoring to the data packet of the roaming terminal and sending to the destination device.

Wherein, the step of the ASN in the roaming area network sending subsequent data packets of the roaming terminal to the destination device according to the RID of the destination device comprises:

the ASN in the roaming area network re-encapsulating the data packet of the roaming terminal by using the RID of the destination device and the RID of the roaming terminal as the destination address and the source address of the re-encapsulated data packet respectively, and sending the re-encapsulated data packet to the roaming gateway;

the roaming gateway sending the re-encapsulated data packet to the destination ASN according to the RID of the destination device; and the destination ASN de-encapsulating the received data packet re-encapsulated by the ASN in the roaming area network, restoring to the data packet of the roaming terminal and sending to the destination device.

The method further comprises:

when requesting to query the RID of the destination device to the roaming gateway, the ASN in the roaming area network further sending the first data packet to the roaming gateway;

when querying the RID of the destination device from the home network of the destination device, the roaming gateway further sending the first data packet to the home network of the destination device; and after querying out the RID of the destination device, the home network of the destination device sending the first data packet to the destination ASN according to the queried RID.

The step of the ASN of the roaming area network sending the AID of the destination device to the roaming gateway to request to query the RID of the destination device comprises: the ASN of the roaming area network requesting to query the RID of the destination device by sending to the roaming gateway an AID-RID query message carrying the AID of the destination device;

the step of the roaming gateway sending the AID of the destination device to the mapping forwarding plane of the home network of the destination device to request to query the RID of the destination device comprises: the roaming gateway requesting to query the RID of the destination device by sending to the mapping forwarding plane of the home network of the destination device an AID-RID request message carrying the AID of the destination device;

the step of the mapping forwarding plane of the home network of the destination device sending the AID-RID mapping information of the destination device to the roaming gateway comprises: the mapping forwarding plane of the home network of the destination device sending the AID-RID mapping information of the destination device to the roaming gateway through returning an AID-RID request result message to the roaming gateway;

the step of the roaming gateway forwarding the AID-RID mapping information of the destination device to the ASN of the roaming area network comprises: the roaming gateway sending the AID-RID mapping information of the destination device to the ASN of the roaming area network through sending an AID-RID query result message to the ASN of the roaming area network.

The step of the roaming terminal requesting attachment to the ASN of the roaming area network, and sending the AID of the roaming terminal to the ASN of the roaming area network comprises: the roaming terminal requesting attachment to the ASN of the roaming area network by sending an attachment request message carrying the AID of the roaming terminal;

the step of ASN of the roaming area network requesting access to the roaming gateway comprises: the ASN of the roaming area network requesting access to the roaming gateway by sending an access request message;

the step of the roaming gateway requesting authentication to the authentication center of the home network of the roaming terminal comprises: the roaming gateway requesting authentication to the authentication center of the home network of the roaming terminal by sending an authentication request message;

the step of the authentication center informing the roaming gateway of the authentication result comprises: the authentication center informing the roaming gateway of the authentication result by sending an authentication result message;

the step of the roaming gateway informing the ASN of the roaming area network of the access result comprises: the roaming gateway informing the ASN of the roaming area network of the access result by sending an access response message;

the step of the ASN of the roaming area network informing the roaming terminal of the attachment result comprises: the ASN of the roaming area network informing the roaming terminal of the attachment result by sending an attachment response message.

The ASN of the roaming area network stores configuration information of an AID range of a local network, and the ASN of the roaming area network distinguishes a terminal of the local network from the roaming terminal according to the configuration information of the AID range of the local network;

the roaming gateway stores configuration information of the AID range of each network connected with the roaming gateway, and the roaming gateway distinguishes terminals of different networks according to the configuration information of the AID range of each network.

The invention further provides a system for implementing inter-network roam, which is applied in a network of access identifier and location identifier separation, wherein, in the network, an access identifier (AID) is used as a user identity identifier of a terminal and a routing identifier (RID) is used as a location identifier of the terminal, and the system comprises a roaming terminal, a destination device, an access service node (ASN) of a roaming area network, and a roaming gateway, wherein:

the roaming terminal is configured to, after attaching to the ASN of the roaming area network, send a first data packet to the destination device, wherein a destination address of the first data packet is an AID of the destination device;

the ASN of the roaming area network is configured to, after receiving the first data packet, locally query AID-RID mapping information, and request to query a RID of the destination device to the roaming gateway if the RID of the destination device is not found and the destination device does not belong to the roaming area network; and send subsequent data packets of the roaming terminal to the destination device according to the RID after receiving the RID of the destination device returned by the roaming gateway;

the roaming gateway is configured to, query the RID of the destination device from a home network of the destination device and return the RID of the destination device to the ASN in the roaming area network.

The ASN of the roaming area network is configured to request to query the RID of the destination device to the roaming gateway in the following way: sending the AID of the destination device to the roaming gateway to request to query the RID of the destination device;

the roaming gateway is configured to, after receiving the AID of the destination device, analyze the AID to acquire the home network of the destination device, and send the AID of the destination device to a mapping forwarding plane of the home network of the destination device to request to query the RID of the destination device;

receive and store AID-RID mapping information of the destination device queried by the mapping forwarding plane of the home network of the destination device according to the AID of the destination device, and forward the AID-RID mapping information to the ASN of the roaming area network.

The roaming terminal is further configured to request attachment to the ASN of the roaming area network, and send the AID of the roaming terminal to the ASN of the roaming area network;

the ASN of the roaming area network is further configured to identify that the roaming terminal does not belong to a local network according to the AID of the roaming terminal, and request access to the roaming gateway; and receive an access result sent by the roaming gateway, and inform the roaming terminal of an attachment result;

the roaming gateway is further configured to search for a home network of the roaming terminal according to the AID of the roaming terminal, and request authentication to an authentication center of the home network of the roaming terminal; and, receive an authentication result sent by the authentication center, and inform the ASN of the roaming area network of the access result.

The ASN in the roaming area network is configured to send subsequent data packets of the roaming terminal to the destination device according to the RID of the destination device in the following way:

re-encapsulating the data packet of the roaming terminal by using the RID of the destination device and the RID of the roaming terminal as the destination address and the source address of the re-encapsulated data packet respectively, and sending the re-encapsulated data packet to a destination ASN through a media plane channel between the ASN in the roaming area network and the destination ASN;

the destination ASN de-encapsulating the received data packet re-encapsulated by the ASN in the roaming area network, restoring to the data packet of the roaming terminal and sending to the destination device.

The ASN in the roaming area network is configured to send subsequent data packets of the roaming terminal to the destination device according to the RID of the destination device in the following way:

re-encapsulating the data packet of the roaming terminal by using the RID of the destination device and the RID of the roaming terminal as the destination address and the source address of the re-encapsulated data packet respectively, and sending the re-encapsulated data packet to the roaming gateway;

the roaming gateway sending the re-encapsulated data packet to the destination ASN according to the RID of the destination device;

the destination ASN de-encapsulating the received data packet re-encapsulated by the ASN in the roaming area network, restoring to the data packet of the roaming terminal and sending to the destination device.

The ASN in the roaming area network is further configured to, when requesting to query the RID of the destination device to the roaming gateway, sending the first data packet to the roaming gateway;

the roaming gateway is further configured to, when querying the RID of the destination device from the home network of the destination device, send the first data packet to the home network of the destination device;

the home network of the destination device is further configured to, after querying out the RID of the destination device, send the first data packet to the destination ASN according to the queriedRID.

The ASN of the roaming area network is configured to request to query the RID of the destination device by sending to the roaming gateway an AID-RID query message carrying the AID of the destination device;

the roaming gateway is configured to:

request to query the RID of the destination device by sending to the mapping forwarding plane of the home network of the destination device an AID-RID request message carrying the AID of the destination device;

receive an AID-RID request result message returned by the mapping forwarding plane of the home network of the destination device to acquire the AID-RID mapping information of the destination device; and send the AID-RID mapping information of the destination device to the ASN of the roaming area network through sending an AID-RID query result message to the ASN of the roaming area network.

The roaming terminal is configured to request attachment to the ASN of the roaming area network, and send the AID of the roaming terminal to the ASN of the roaming area network in the following way: requesting attachment to the ASN of the roaming area network by sending an attachment request message carrying the AID of the roaming terminal;

the ASN of the roaming area network is configured to: request access to the roaming gateway by sending an access request message; and inform the roaming terminal of the attachment result by sending an attachment response message;

the roaming gateway is configured to: request authentication to the authentication center of the home network of the roaming terminal by sending an authentication request message; receive an authentication result message sent by the authentication center; and inform the ASN of the roaming area network of the access result by sending an access response message.

The ASN of the roaming area network stores configuration information of an AID range of a local network, and the ASN of the roaming area network is further configured to distinguish a terminal of the local network from the roaming terminal according to the configuration information of the AID range of the local network;

the roaming gateway stores configuration information of the AID range of each network connected with the roaming gateway, and the roaming gateway is further configured to distinguish terminals of different networks according to the configuration information of the AID range of each network.

The invention further provides a method for implementing inter-network roam, wherein, the method is applied in a network of access identifier and location identifier separation, in the network, an access identifier (AID) is used as a user identity identifier of a terminal and a routing identifier (RID) is used as a location identifier of the terminal, and the method comprises:

after attaching to an Access Service Node (ASN) of a roaming area network, a roaming terminal sending a first data packet to a destination device, wherein a destination address of the first data packet is the AID of the destination device;

after receiving the first data packet, the ASN in the roaming area network querying locally AID-RID mapping information, and requesting a local mapping forwarding plane to query the RID of the destination device if the RID of the destination device is not found and the destination device does not belong to the roaming area network;

the local mapping forwarding plane querying the RID of the destination device and returning to the ASN in the roaming area network; and according to the RID of the destination device, the ASN in the roaming area network sending subsequent data packets of the roaming terminal to the destination device.

The method further comprising:

when requesting the local mapping forwarding plane to query the RID of the destination device, the ASN in the roaming area network further sending the first data packet to the mapping forwarding plane;

after querying out the RID of the destination device, the local mapping forwarding plane sending the first data packet to the destination ASN according to the queriedRID.

The invention further provides a system for implementing inter-network roam, wherein, the system is applied in a network of access identifier and location identifier separation, in the network, an access identifier (AID) is used as a user identity identifier of a terminal and a routing identifier (RID) is used as a location identifier of the terminal, and the system comprises a roaming terminal, a destination device, an access service node (ASN) of a roaming area network, and a local mapping forwarding plane, wherein:

the roaming terminal is configured to, after attaching to the ASN of the roaming area network, send a first data packet to the destination device, wherein a destination address of the first data packet is an AID of the destination device;

the ASN of the roaming area network is configured to, after receiving the first data packet, locally query AID-RID mapping information, and request the local mapping forwarding plane to query a RID of the destination device if the RID of the destination device is not found and the destination device does not belong to the roaming area network; and send subsequent data packets of the roaming terminal to the destination device according to the RID after receiving the RID of the destination device returned by the local mapping forwarding plane;

the local mapping forwarding plane is configured to query the RID of the destination device and return to the ASN in the roaming area network.

The ASN in the roaming area network is further configured to, when requesting the local mapping forwarding plane to query the RID of the destination device, send the first data packet to the mapping forwarding plane;

the local mapping forwarding plane is further configured to, after querying out the RID of the destination device, send the first data packet to the destination ASN according to the queriedRID.

The invention further provides an querying method, wherein, the method is applied in a network of access identifier and location identifier separation, in the network, an access identifier (AID) is used as a user identity identifier of a terminal and a routing identifier (RID) is used as a location identifier of the terminal, and the method comprises:

an access service node (ASN) sending the AID of a device to a roaming gateway to request to query the RID of the device;

after receiving the AID of the device, the roaming gateway analyzing the AID to acquire a home network of the device, and sending the AID of the device to a mapping forwarding plane of the home network of the destination device to request to query the RID of the device; and after querying out a corresponding RID according to the AID of the device, the mapping forwarding plane of the home network of the device sending AID-RID mapping information of the device to the roaming gateway, and the roaming gateway storing the AID-RID mapping information and then forwarding to the ASN.

The step of the ASN sending the AID of the device to the roaming gateway to request to query the RID of the device comprises: the ASN requesting to query the RID of the device by sending to the roaming gateway an AID-RID query message carrying the AID of the device;

the step of the roaming gateway sending the AID of the device to the mapping forwarding plane of the home network of the device to request to query the RID of the device comprises: the roaming gateway requesting to query the RID of the device by sending to the mapping forwarding plane of the home network of the device an AID-RID request message carrying the AID of the device;

the step of the mapping forwarding plane of the home network of the device sending the AID-RID mapping information of the device to the roaming gateway comprises: the mapping forwarding plane of the home network of the device sending the AID-RID mapping information of the device to the roaming gateway through returning an AID-RID request result message to the roaming gateway;

the step of the roaming gateway forwarding the AID-RID mapping information of the device to the ASN comprises: the roaming gateway sending the AID-RID mapping information of the device to the ASN through sending an AID-RID query result message to the ASN.

The invention further provides an querying system, wherein, the system is applied in a network of access identifier and location identifier separation, in the network, an access identifier (AID) is used as a user identity identifier of a terminal and a routing identifier (RID) is used as a location identifier of the terminal, and the system comprises an access service node (ASN), a roaming gateway, and a mapping forwarding plane of a home network of a device;

the ASN is configured to, send the AID of the device to the roaming gateway to request to query the RID of the device;

the roaming gateway is configured to, after receiving the AID of the device, analyze the AID to acquire the home network of the device, and send the AID of the device to the mapping forwarding plane of the home network of the device to request to query the RID of the device; and store and forward AID-RID mapping information to the ASN after receiving the AID-RID mapping information returned by the mapping forwarding plane of the home network of the device;

the mapping forwarding plane of the home network of the device is configured to, after querying out a corresponding RID according to the AID of the device, send the AID-RID mapping information of the device to the roaming gateway.

The ASN is configured to, request to query the RID of the device by sending to the roaming gateway an AID-RID query message carrying the AID of the device;

the roaming gateway is configured to, request to query the RID of the device by sending to the mapping forwarding plane of the home network of the device an AID-RID request message carrying the AID of the device; and send the AID-RID mapping information of the device to the ASN through sending an AID-RID query result message to the ASN;

the mapping forwarding plane of the home network of the device is configured to send the AID-RID mapping information of the device to the roaming gateway through returning an AID-RID request result message to the roaming gateway.

The invention further provides a method for network attachment, wherein, the method is applied in a network of access identifier and location identifier separation, in the network, an access identifier (AID) is used as a user identity identifier of a terminal and a routing identifier (RID) is used as a location identifier of the terminal, and the method comprises:

a roaming terminal requesting attachment to an access service node (ASN) of a roaming area network, and sending the AID of the roaming terminal to the ASN of the roaming area network;

the ASN of the roaming area network identifying that the roaming terminal does not belong to a local network according to the AID of the roaming terminal, and requesting access to a roaming gateway;

the roaming gateway searching for a home network of the roaming terminal according to the AID of the roaming terminal, and requesting authentication to an authentication center of the home network of the roaming terminal;

the authentication center informing the roaming gateway of an authentication result after authenticating the roaming terminal; and the roaming gateway informing the ASN of the roaming area network of an access result, and the ASN of the roaming area network informing the roaming terminal of an attachment result.

The step of the roaming terminal requesting attachment to the ASN of the roaming area network, and sending the AID of the roaming terminal to the ASN of the roaming area network comprises: the roaming terminal requesting attachment to the ASN of the roaming area network by sending an attachment request message carrying the AID of the roaming terminal;

the step of ASN of the roaming area network requesting access to the roaming gateway comprises: the ASN of the roaming area network requesting access to the roaming gateway by sending an access request message;

the step of the roaming gateway requesting authentication to the authentication center of the home network of the roaming terminal comprises: the roaming gateway requesting authentication to the authentication center of the home network of the roaming terminal by sending an authentication request message;

the step of the authentication center informing the roaming gateway of the authentication result comprises: the authentication center informing the roaming gateway of the authentication result by sending an authentication result message;

the step of the roaming gateway informing the ASN of the roaming area network of the access result comprises: the roaming gateway informing the ASN of the roaming area network of the access result by sending an access response message;

the step of the ASN of the roaming area network informing the roaming terminal of the attachment result comprises: the ASN of the roaming area network informing the roaming terminal of the attachment result by sending an attachment response message.

The invention further provides a system for network attachment, wherein, the system is applied in a network of access identifier and location identifier separation, in the network, an access identifier (AID) is used a the user identity identifier of a terminal and a routing identifier (RID) is used a the location identifier of the terminal, and the system comprises a roaming terminal, an access service node (ASN) of a roaming area network, a roaming gateway and an authentication center of a home network of the roaming terminal;

the roaming terminal is configured to request attachment to the ASN of the roaming area network, and send the AID of the roaming terminal to the ASN of the roaming area network;

the ASN of the roaming area network is configured to identify that the roaming terminal does not belong to a local network according to the AID of the roaming terminal, and request access to the roaming gateway; and inform the roaming terminal of an attachment result after receiving an access result returned by the roaming gateway;

the roaming gateway is configured to search for the home network of the roaming terminal according to the AID of the roaming terminal, and request authentication to the authentication center of the home network of the roaming terminal; and inform the ASN of the roaming area network of the access result after receiving an authentication result returned by the authentication center of the home network of the roaming terminal;

the authentication center of the home network of the roaming terminal is configured to authenticate the roaming terminal and then inform the roaming gateway of the authentication result.

The roaming terminal is configured to request attachment to the ASN of the roaming area network by sending an attachment request message carrying the AID of the roaming terminal;

the ASN of the roaming area network is configured to request access to the roaming gateway by sending an access request message; and inform the roaming terminal of the attachment result by sending an attachment response message;

the roaming gateway is configured to request authentication to the authentication center of the home network of the roaming terminal by sending an authentication request message; and inform the ASN of the roaming area network of the access result by sending an access response message;

the authentication center is configured to inform the roaming gateway of the authentication result by sending an authentication result message.

The present invention has the following beneficial effects:

1) the network is simple, a roaming gateway interconnects and intercommunicates with each network, and in view of a certain network, the roaming gateway is part of its network, the service roaming away is accessed to the home network from the roaming gateway, and a certain network does not need to establish a complicated network structure with other roaming mates, thereby simplifying the structure of the network;

2) the roaming gateway has a network isolating function, and can shield the network structure of other roaming mates for the network, and the network only needs to implement communication-related data configuration with the roaming gateway and does not need to know the network structures of other roaming mates;

3) the roaming gateway has inter-network settlement and statistics function, and can make statistics on the traffic flow between various roaming mates, and thus facilitates charging settlement, formulation of service development plan, operation optimization and so on;

4) it is convenient to quickly establish a roaming relationship, and the network only needs to interconnect and intercommunicate with the roaming gateway to simultaneously open technically the roaming services with a plurality of networks, thus saving the time for construction.

SPECIFIC EMBODIMENTS

Figure 1:
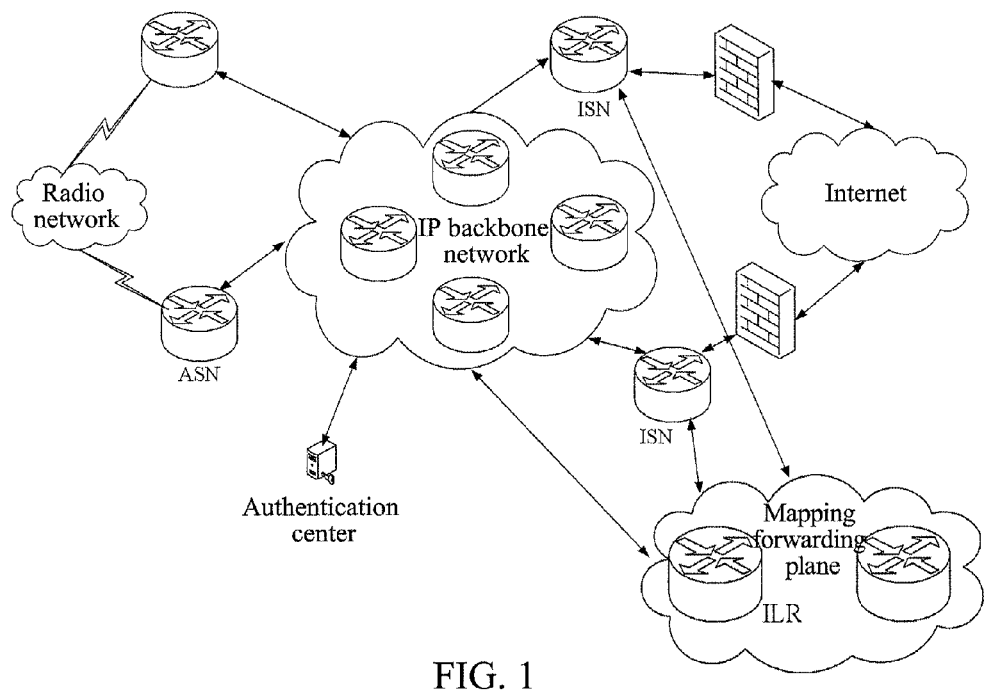
FIG. 1 illustrates the architecture of the network of identity identifier and location identifier separation.

FIG. 1 illustrates the architecture of the network implementing identity identifier and location identifier separation based on an IP network router, wherein the logic function of each network element is as follows.

An access service node (ASN) is responsible for providing access services for various mobile terminals, distributing a RID to an accessed terminal, and encapsulating the data message of the terminal and then sending to the core network to transmit, and is responsible for querying the location of the opposite communication end, and if the ASN does not store the routing location information of the opposite communication end, the ASN searches through a mapping forwarding plane.

The mapping forwarding plane is composed of a plurality of Identity Location Register/Packet Transfer Function (ILR/PTF), and is responsible for maintaining the mapping information between the identity identifier and the routing identifier of the terminal in the network, and providing query services for the ASN and other ILRs.

An authentication center is responsible for recording information such as terminal type and service level, and when a terminal accesses, performing validity authentication and authorization for the terminal. The authentication center supports bidirectional authentication between the network and the terminal.

An IP backbone network is the interconnecting network between ASNs, and the main function of the backbone network is to perform routing and forward a data message according to the routing identifier in the data message to forward the data sent by the ASN to the correct destination; the IP network is composed of a core switching router (CSR). The IP backbone network is the same as the existing IP network, and does not need any modification.

An ISN (Interconnect Service Node) is an intercommunication node between the network of identity identifier and location identifier separation and other networks, and two different types of networks must communicate with each other through the ISN.

An RAN (Radio Access Network) is responsible for providing and maintaining a two-layer link from the terminal to the ASN, and in a cellular mobile network, it is responsible for distribution and management of radio resources. The RAN may be WCDMA (Wideband Code Division Multiple Access), TD-SCDMA (Time Division-Synchronization Code Division Multiple Access), CDMA2000 (code division multiple access 2000), LTE (Long Term Evolution), and other radio networks.

Figure 2:
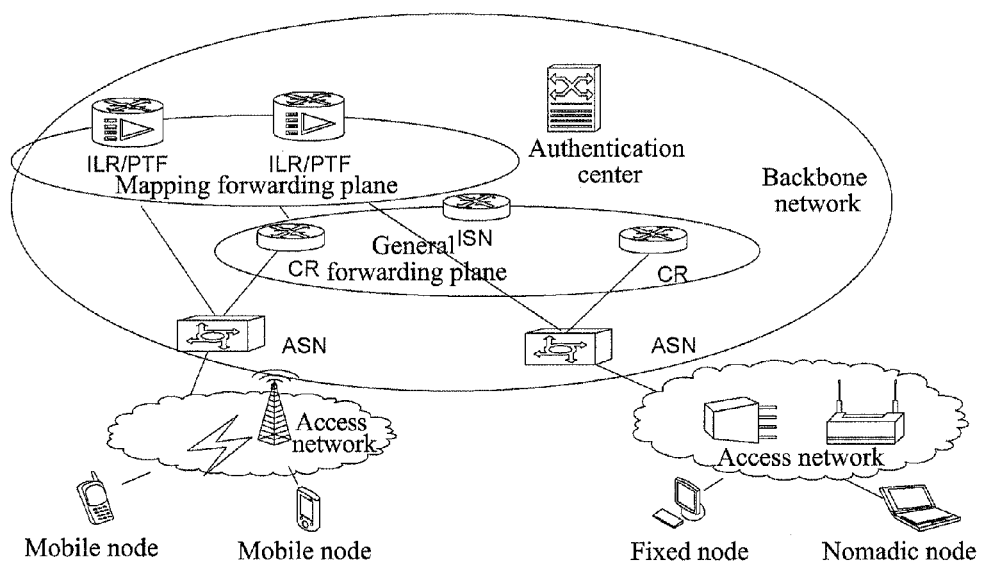
FIG. 2 illustrates the architecture of another network of identity identifier and location identifier separation.

FIG. 2 illustrates the architecture of another network of identity identifier and location identifier separation. In this architecture, the network is divided into access networks and a backbone network. The access network is located on the edge of the backbone network and is responsible for access of all terminals. The backbone network is responsible for routing and forwarding data messages between terminals accessing through the access networks. The access network and the backbone network do not overlap in terms of topology relationship.

There are two types of identifiers in the network of the present architecture, namely, Access Identifier (AID), and Routing-Location Identifier (RID). Wherein, the AID is the user identity identifier of the terminal and is used to identify the identity of the terminal user (also referred to as user for short), and the network uniquely distributes to each terminal user an AID, which is used in the access network and is kept unchanged during the movement of the terminal; the RID is the location identifier distributed to the terminal and is used in the backbone network.

In the present architecture, the terminal accessing to the network may be one or more of mobile terminal, fixed terminal and nomadic terminal, such as a mobile phone, a fixed telephone, a computer, an application server and so on.

In the present architecture, the access network is used to provide a means for accessing to the two layers (physical layer and link layer) for the terminal, and maintain the physical access link between the terminal and the ASN. Possible means for two-layer access includes: cellular mobile network technology (GSM/CDMA/TD-SCDMA/WCDMA/WiMAX/LTE), DSL, broadband fiber access or WiFi access, and the like.

The backbone network of the present architecture is divided into two planes in networking, namely, a general forwarding plane and a mapping forwarding plane, and further includes an ASN (Access Service Node) and an authentication center.

The ASN is the division node between the general forwarding plane, mapping forwarding plane and the access network, and has interfaces with the access network, and the general forwarding plane and mapping forwarding plane. The ASN is used to provide access services for terminals, maintain the connection between a terminal and the network, distribute a RID to the terminal, register to the mapping forwarding plane and query the RID of the terminal, maintain the AID-RID mapping information, and realize routing and forwarding of a data message.

The general forwarding plane is mainly used to perform routing according to the RID in the data message and forward the data message using the RID as the destination address, and the data routing forwarding action in the general forwarding plane is consistent with that in Legacy IP network. As shown in the figure, the main network elements in the general forwarding plane include a CR (Common Router) and an ISN (Interconnect Service Node).

The mapping forwarding plane is mainly used to store the identify-location mapping information of the terminal (i.e., the AID-RID mapping information), process registration and query of the location of the terminal, route and forward the data message taking the AID as the destination address. As shown in the figure, the main network elements of the mapping forwarding plane include an ILR/PTF (Identity Location Register/Packet Transfer Function).

Authentication center is used for recording the attribute information, including user type, authentication information, user service level and so on, of the terminal users in the network of the present architecture, and completing access authentication and authorization for the terminal, and the authentication center also has the charging function. The Authentication center supports bi-directional authentication between the terminal and the network, and can generate user security information used for authentication, integrity protection and encryption.

Figure 3:
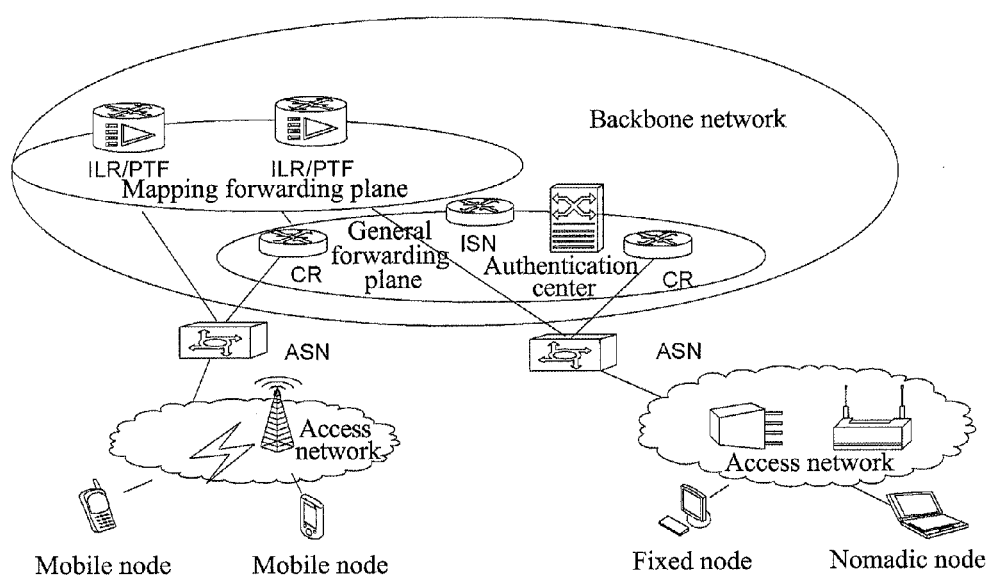
FIG. 3 illustrates the architecture of a third network of identity identifier and location identifier separation.

In another example, the ASN is independent from the backbone network in division of the architecture and located on the division node between the backbone network and the access network, and the ASN has interfaces with the access network and the backbone network, as shown in FIG. 3. The practically implemented function of the ASN is the same as in FIG. 2.

Figure 4:
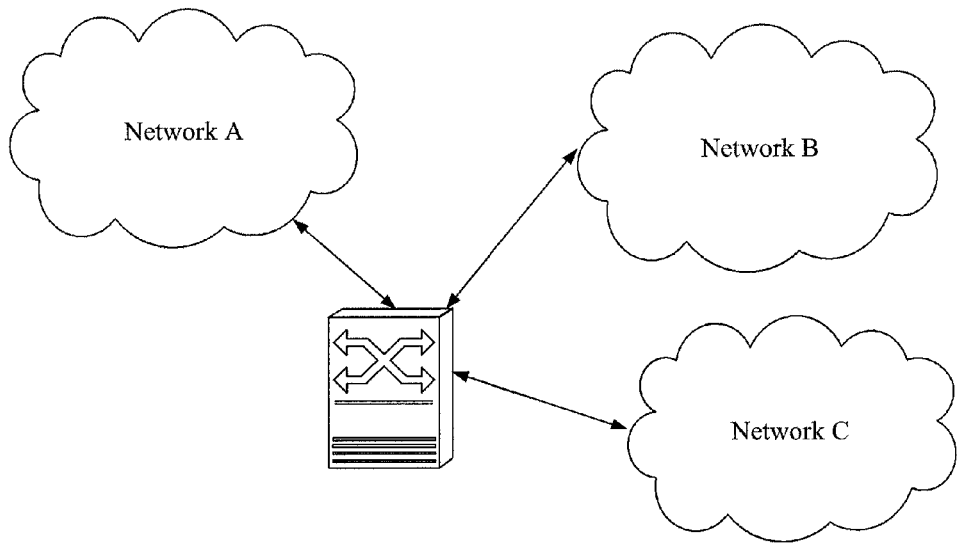
FIG. 4 illustrates the structure of connecting different networks according to the present invention.

As shown in FIG. 4, in the present invention, a roaming gateway is disposed between networks, and a network interconnecting relationship, including intercommunication between a control plane channel (signaling channel) and a media plane channel (the media plane channel refers to a data channel between ASNs; if various networks can directly intercommunicate with each other, the intercommunication of the media plane channels is optional), is established between each network and the roaming gateway, thereby achieving supporting to the roam of the user between various networks. In FIG. 4, the three networks A, B and C interconnect and intercommunicate with the roaming gateway respectively, and no point-to-point roaming relationship needs to be established between networks.

The roaming gateway, in view of each network, is a component of the network, and can communicate with the authentication center to transmit authentication information and forward data, and so on.

In the network of identity identifier and location identifier separation, due to the presence of the mapping forwarding plane, the roaming gateway needs to communicate with the mapping forwarding plane of each network, and the ASN of the network visited by the roaming user can query out the AID-RID mapping information of the roaming user from the home network through the roaming gateway.

One network may be interconnected with one or more roaming gateways, i.e., a network possessing roaming ability has at least one ILR/PTF for communicating with the roaming gateway, and the roaming gateway provides the function of querying AID-RID mapping information and first packet forwarding function for the ASN of the roaming area of the user through the ILR/PTF communicating with the roaming gateway.

The roaming gateway has the same network status as the ASN, and only slightly differs in function.

The ASN of the network must have the ability of identifying AID, and be capable of distinguishing terminals of the home network and the roaming network and the AIDs of the servers.

The roaming gateway also must have the ability of identifying AID, and be capable of distinguishing terminals of different networks and AIDs of servers for processing.

In order to make full use of the existing backbone network, the data packets between ASNs are standard IP packets so as to ensure that routing can be implemented in the IP backbone network.

Figure 5:
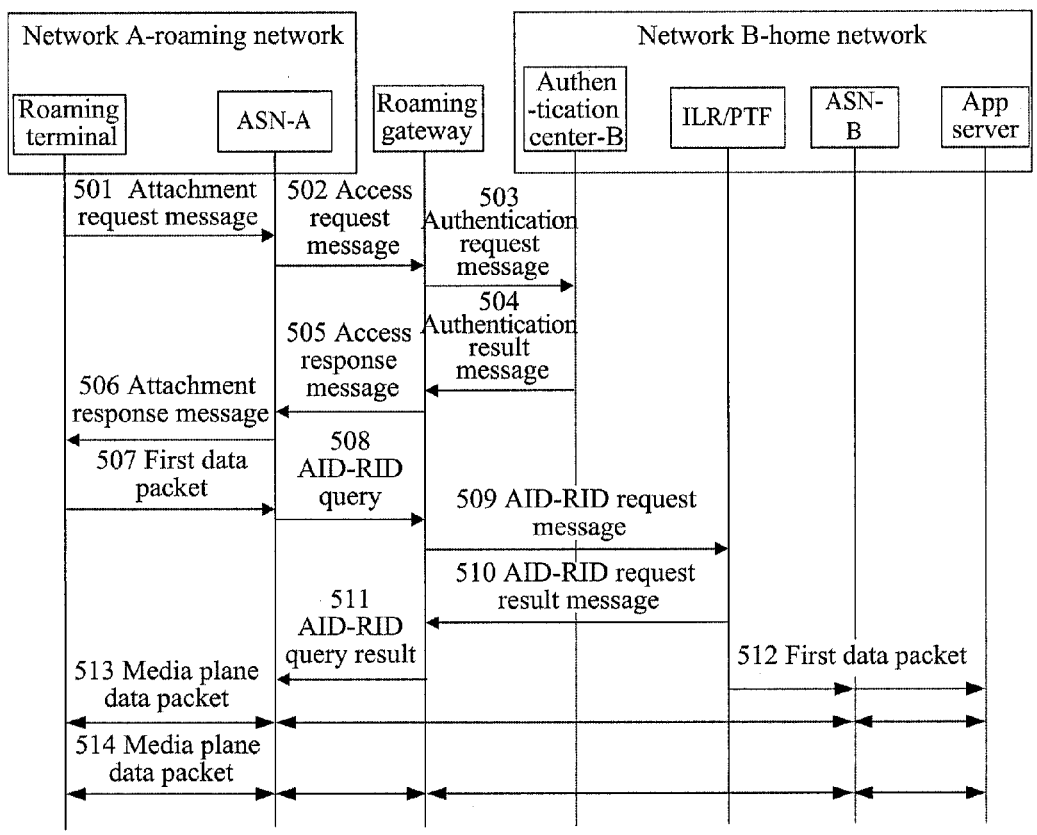
FIG. 5 is a flowchart of the method for implementing inter-network roam according to the present invention.

FIG. 5 illustrates the method for implementing inter-network roaming. It is assumed that a roaming user accesses via the ASN-A in the roaming network A to visit the application server (APP Server) in the home area, this application server is located under ASN-B of the home network of the roaming user, and devices, such as an authentication center, an ILR and other devices, have been deployed in the home place. Then the process of visiting the application server of the home place comprises:

501: the terminal of a user (roaming terminal) initiating an attachment request by sending an attachment request message (Attach Req), which carries the AID of the user, to the ASN (ASN-A) of the roaming area;

502: the ASN-A analyzing the AID of the user, finding that the user is a roaming user, and then sending an access request (Access Req) message to the roaming gateway to request access;

wherein, the configuration information of the AID range of the local network may be stored in the ASN to distinguish the user of the local network from the roaming user;

503: the roaming gateway analyzing the AID of the user, acquiring and searching for the home network (network B) of the user; sending an authentication request (Auth Req) message to the authentication center (which has been configured in advance) of the network B;

wherein, the configuration information of the AID range of each network may be stored in the roaming gateway, and the roaming gateway distinguishes terminals of different networks according to the configuration information and searches for the corresponding network;

504: the authentication center that has received the Auth Req authenticating the user, and returning an authentication result (Auth Res) message to the roaming gateway to inform the roaming gateway of the authentication result;

505: after receiving the Auth Res message, the roaming gateway returning an access response message (Access Res) to the ASN-A to inform the ASN-A of the access result;

506: after receiving the access response message, the ASN-A returning an attachment response message (Attach Res) to the terminal to inform the roaming terminal of the attachment result;

507: in a case of successful access, the source terminal initiating a service request, sending a first data packet (Service First Data), wherein, it is assumed that the source terminal visits the application server of the home area, and its AID is AID-B, then the source address of the first data packet is the AID of the source terminal and its destination address is AID-B;

508: after receiving the data packet transmitted by the source terminal, the ASN-A locally querying the RID corresponding to the AID-B, and if no corresponding RID is found, the ASN-A analyzing AID-B and judging whether the destination device belongs to the roaming network, if not, sending to the roaming gateway an AID-RID query message (AID-RID Query) carrying the AID-B, and sending the first data packet to the roaming gateway;

if the destination device belongs to the roaming area network, then the ASN-A querying the RID corresponding to AID-B in the local mapping forwarding plane, and sending the first data packet to the local mapping forwarding plane, the local mapping forwarding plane, after querying out the RID corresponding to AID-B, sending the first data packet to the destination ASN according to the RID, and sending the AID-RID mapping information of the destination device to the ASN-A, the ASN-A sending subsequent data packets of the roaming terminal to the destination ASN according to the AID-RID mapping information of the destination device;

509: after receiving the AID-RID Query, the roaming gateway analyzing the AID of the destination device to acquire the network to which the destination device belongs to (network B), sending an AID-RID Req (request) message carrying AID-B to the mapping forwarding plane of the network B, and forwarding the received first data packet to the mapping forwarding plane of the network B;

510: the mapping forwarding plane of the network B querying the corresponding RID according to AID-B, returning an AID-RID request result (AID-RID Res) message to the roaming gateway, and sending the AID-B-to-RID mapping information to the roaming gateway, and the roaming gateway storing the AID-B-to-RID mapping information;

511: the roaming gateway returning an AID-RID Query Res message to the ASN-A, and sending the AID-B-to-RID mapping information to the ASN-A, and the ASN-A locally storing the AID-B-to-RID mapping information;

512: the mapping forwarding plane of network B sending the first data packet to an ASN-B according to the RID corresponding to AID-B, and the ASN-B forwarding the first data packet to the application server visited by the source terminal;

wherein, after the above step 511, the ASN-A has acquired the RID corresponding to AID-B, and in the process of transmitting subsequent data packets, depending on different networking of the network, there are two possible cases, which are as described in steps 513 and 514 respectively:

513: if the ASN-A in the roaming network can directly communicate with the media plane channel of the ASN-B in the home network (the ASN-A does not directly communicate with the authentication center or the mapping plane of the network B), then the ASN-A re-encapsulating the media plane data packet of the roaming terminal by using the RID of the destination device and the RID of the roaming terminal as the destination address and the source address of the re-encapsulated data packet respectively, and sending the re-encapsulated data packet to the ASN-B, and the ASN-B de-encapsulating the received data packet re-encapsulated by the ASN-A, restoring the data packet to the media plane data packet of the roaming terminal and sending to the application server;

wherein, when the ASN-A can communicate with the media plane of the ASN-B, the media plane data do not need to pass through the roaming gateway;

514: if the ASN-A in the roaming network cannot directly communicate with the media plane of the ASN-B in the home network (the ASN-A does not directly communicate with the authentication center or the mapping plane of the network B), then the ASN-A re-encapsulating the media plane data packet of the terminal by using the RID of the destination device and the RID of the roaming terminal as the destination address and the source address of the re-encapsulated data packet respectively, and sending the re-encapsulated data packet to the roaming gateway, and the roaming gateway sending the re-encapsulated data packet to the ASN-B, and the ASN-B de-encapsulating the received data packet re-encapsulated by the ASN-A in the roaming network, restoring the data packet to the media plane data packet of the roaming terminal and sending the media plane data packet of the roaming terminal to the application server.

The roaming gateway needs to search for the destination AID-to-RID mapping information of the data packet so as to send the data packet to the correct ASN, and then the ASN sending the data packet to the corresponding destination terminal or application server.

The roaming gateway does not modify the encapsulation format or content of the data packet sent out by the ASN, and only analyzes and makes statistics on the data, and sends the data packet to the correct ASN after searching for the AID-RID mapping relationship for each received data packet.

The present invention further provides a system for implementing inter-network roam, which is applied in a network of access identifier and location identifier separation, and comprises a roaming terminal, a destination device, an access service node (ASN) of a roaming area network, and a roaming gateway, wherein:

the roaming terminal is used to, after attaching to the ASN of the roaming area network, send a first data packet to the destination device, wherein a destination address of the first data packet is an AID of the destination device;

the ASN of the roaming area network is used to, after receiving the first data packet, locally query AID-RID mapping information, and request to query a RID of the destination device to the roaming gateway if the RID of the destination device is not found and the destination device does not belong to the roaming area network; and send subsequent data packets of the roaming terminal to the destination device according to the RID after receiving the RID of the destination device returned by the roaming gateway;

the process of the ASN of the roaming area network requesting the roaming gateway to query the RID of the destination device and the roaming gateway querying the RID of the destination device comprises:

the ASN of the roaming area network sending the AID of the destination device to the roaming gateway to request to query the RID of the destination device;

after receiving the AID of the destination device, the roaming gateway analyzing the AID to acquire the home network of the destination device, and sending the AID of the destination device to a mapping forwarding plane of the home network of the destination device to request to query the RID of the destination device;

after querying out a corresponding RID according to the AID of the destination device, the mapping forwarding plane of the home network of the destination device sending the AID-RID mapping information of the destination device to the roaming gateway, and the roaming gateway storing the AID-RID mapping information and then forwarding to the ASN of the roaming area network.

The roaming gateway is used to, query the RID of the destination device from a home network of the destination device and return the RID of the destination device to the ASN in the roaming area network.

The process of the roaming terminal attaching to the ASN of the roaming area network comprises:

the roaming terminal requesting attachment to the ASN of the roaming area network, and sending the AID of the roaming terminal to the ASN of the roaming area network;

the ASN of the roaming area network identifying that the roaming terminal does not belong to a local network according to the AID of the roaming terminal, and requesting access to the roaming gateway;

the roaming gateway searching for a home network of the roaming terminal according to the AID of the roaming terminal, and requesting authentication to an authentication center of the home network of the roaming terminal;

the authentication center authenticating the roaming terminal and then informing the roaming gateway of an authentication result;

the roaming gateway informing the ASN of the roaming area network of an access result, and the ASN of the roaming area network informing the roaming terminal of an attachment result.

The process of the ASN in the roaming area network sending subsequent data packets of the roaming terminal to the destination device according to the RID of the destination device comprises:

the ASN in the roaming area network re-encapsulating the data packet of the roaming terminal by using the RID of the destination device and the RID of the roaming terminal as the destination address and the source address of the re-encapsulated data packet respectively, and sending the re-encapsulated data packet to a destination ASN through a media plane channel between the ASN in the roaming area network and the destination ASN;

the destination ASN de-encapsulating the received data packet re-encapsulated by the ASN in the roaming area network, restoring to the data packet of the roaming terminal and sending to the destination device; or the ASN in the roaming area network re-encapsulating the data packet of the roaming terminal by using the RID of the destination device and the RID of the roaming terminal as the destination address and the source address of the re-encapsulated data packet respectively, and sending the re-encapsulated data packet to the roaming gateway;

the roaming gateway sending the re-encapsulated data packet to the destination ASN according to the RID of the destination device;

the destination ASN de-encapsulating the received data packet re-encapsulated by the ASN in the roaming area network, restoring to the data packet of the roaming terminal and sending to the destination device.

The ASN in the roaming area network is further used to, when requesting to query the RID of the destination device to the roaming gateway, send the first data packet to the roaming gateway;

the roaming gateway is further used to, when querying the RID of the destination device from the home network of the destination device, send the first data packet to the home network of the destination device; and the home network of the destination device is further used to, after querying out the RID of the destination device, send the first data packet to the destination ASN according to the queried RID.

The ASN of the roaming area network requests to query the RID of the destination device by sending to the roaming gateway an AID-RID query message carrying the AID of the destination device;

the roaming gateway requests to query the RID of the destination device by sending to the mapping forwarding plane of the home network of the destination device an AID-RID request message carrying the AID of the destination device;

the mapping forwarding plane of the home network of the destination device sends the AID-RID mapping information of the destination device to the roaming gateway through returning an AID-RID request result message to the roaming gateway;

the roaming gateway sends the AID-RID mapping information of the destination device to the ASN of the roaming area network through sending an AID-RID query result message to the ASN of the roaming area network.

The roaming terminal requests attachment to the ASN of the roaming area network by sending an attachment request message carrying the AID of the roaming terminal;

the ASN of the roaming area network requests access to the roaming gateway by sending an access request message;

the roaming gateway requests authentication to the authentication center of the home network of the roaming terminal by sending an authentication request message;

the authentication center informs the roaming gateway of the authentication result by sending an authentication result message;

the roaming gateway informs the ASN of the roaming area network of the access result by sending an access response message;

the ASN of the roaming area network informs the roaming terminal of the attachment result by sending an attachment response message.

The ASN of the roaming area network stores configuration information of an AID range of a local network, and the ASN of the roaming area network distinguishes a terminal of the local network from the roaming terminal according to the configuration information of the AID range of the local network;

the roaming gateway stores configuration information of an AID range of each network connected with the roaming gateway, and the roaming gateway distinguishes terminals of different networks according to the configuration information of the AID range of each network.

Please refer to the description in the content of the method for other functions of the network elements in the system.

Although the preferred examples of the present invention have been disclosed with the purpose of illustration, a person having ordinary skill in the art may realize that various improvements, additions and replacements are also possible. Therefore, the scope of the present invention should not be limited to the above examples.

A person having ordinary skill in the art can appreciate that all or part of the steps in the above step can be implemented by instructing related hardware through a grogram, which may be stored in a computer readable storage medium, such as read-only memory, disk or an optical disk, and so on. Optionally, all or part of the steps in the above examples can be also implemented using one or more integrated circuits. Correspondingly, each module/unit in the above examples can be implemented in the form of hardware, or in the form of software functional module. The present invention is not limited to any specific form of combination of hardware and software.

INDUSTRIAL APPLICABILITY

The present invention has the following beneficial effects:

1) the network is simple, a roaming gateway interconnects and intercommunicates with each network, and in view of a certain network, the roaming gateway is part of its network, the service roaming away is accessed to the home network from the roaming gateway, and a certain network does not need to establish a complicated network structure with other roaming mates, thereby simplifying the structure of the network;

2) the roaming gateway has a network isolating function, and can shield the network structure of other roaming mates for the network, and the network only needs to implement communication-related data configuration with the roaming gateway and does not need to know the network structures of other roaming mates;

3) the roaming gateway has inter-network settlement and statistics function, and can make statistics on the traffic flow between various roaming mates, and thus facilitates charging settlement, formulation of service development plan, operation optimization and so on;

4) it is convenient to quickly establish a roaming relationship, and the network only needs to interconnect and intercommunicate with the roaming gateway to simultaneously open technically the roaming services with a plurality of networks, thus saving the time for construction.

What is claimed is:

1. A method for implementing inter-network roam, wherein, the method is applied in a network of access identifier and location identifier separation, in the network, an access identifier (AID) is used as a user identity identifier of a terminal and a routing identifier (RID) is used as a location identifier of the terminal, and the method comprises:

after attaching to an Access Service Node (ASN) of a roaming area network, a roaming terminal sending a first data packet to a destination device, wherein a destination address of the first data packet is the AID of the destination device;

after receiving the first data packet, the ASN in the roaming area network querying locally AID-RID mapping information, and requesting a roaming gateway to query the RID of the destination device if the RID of the destination device is not found and the destination device does not belong to the roaming area network;

the roaming gateway querying the RID of the destination device from a home network of the destination device and returning the RID of the destination device to the ASN in the roaming area network; and according to the RID of the destination device, the ASN in the roaming area network sending subsequent data packets of the roaming terminal to the destination device.

2. The method according to claim 1, wherein, the step of the ASN of the roaming area network requesting the roaming gateway to query the RID of the destination device comprises: the ASN of the roaming area network sending the AID of the destination device to the roaming gateway to request to query the RID of the destination device;

the step of the roaming gateway querying the RID of the destination device from a home network of the destination device and returning the RID of the destination device to the ASN in the roaming area network comprises:

after receiving the AID of the destination device, the roaming gateway analyzing the AID to acquire the home network of the destination device, and sending the AID of the destination device to a mapping forwarding plane of the home network of the destination device to request to query the RID of the destination device;

after querying out a corresponding RID according to the AID of the destination device, the mapping forwarding plane of the home network of the destination device sending the AID-RID mapping information of the destination device to the roaming gateway, and the roaming gateway storing the AID-RID mapping information and then forwarding to the ASN of the roaming area network.

3. The method according to claim 2, wherein,
the step of the ASN of the roaming area network sending the AID of the destination device to the roaming gateway to request to query the RID of the destination device comprises: the ASN of the roaming area network requesting to query the RID of the destination device by sending to the roaming gateway an AID-RID query message carrying the AID of the destination device;

the step of the roaming gateway sending the AID of the destination device to the mapping forwarding plane of the home network of the destination device to request to query the RID of the destination device comprises: the roaming gateway requesting to query the RID of the destination device by sending to the mapping forwarding plane of the home network of the destination device an AID-RID request message carrying the AID of the destination device;

the step of the mapping forwarding plane of the home network of the destination device sending the AID-RID mapping information of the destination device to the roaming gateway comprises: the mapping forwarding plane of the home network of the destination device sending the AID-RID mapping information of the destination device to the roaming gateway through returning an AID-RID request result message to the roaming gateway;

the step of the roaming gateway forwarding the AID-RID mapping information of the destination device to the ASN of the roaming area network comprises: the roaming gateway sending the AID-RID mapping information of the destination device to the ASN of the roaming area network through sending an AID-RID query result message to the ASN of the roaming area network.

4. The method according to claim 1, wherein, the step of the roaming terminal attaching to the ASN of the roaming area network comprises:

the roaming terminal requesting attachment to the ASN of the roaming area network, and sending the AID of the roaming terminal to the ASN of the roaming area network;

the ASN of the roaming area network identifying that the roaming terminal does not belong to a local network according to the AID of the roaming terminal, and requesting access to the roaming gateway;

the roaming gateway searching for a home network of the roaming terminal according to the AID of the roaming terminal, and requesting authentication to an authentication center of the home network of the roaming terminal;

the authentication center authenticating the roaming terminal and then informing the roaming gateway of an authentication result; and the roaming gateway informing the ASN of the roaming area network of an access result, and the ASN of the roaming area network informing the roaming terminal of an attachment result.

5. The method according to claim 4, wherein,
the step of the roaming terminal requesting attachment to the ASN of the roaming area network, and sending the AID of the roaming terminal to the ASN of the roaming area network comprises: the roaming terminal requesting attachment to the ASN of the roaming area network by sending an attachment request message carrying the AID of the roaming terminal;

the step of ASN of the roaming area network requesting access to the roaming gateway comprises: the ASN of the roaming area network requesting access to the roaming gateway by sending an access request message;

the step of the roaming gateway requesting authentication to the authentication center of the home network of the roaming terminal comprises: the roaming gateway requesting authentication to the authentication center of the home network of the roaming terminal by sending an authentication request message;

the step of the authentication center informing the roaming gateway of the authentication result comprises: the authentication center informing the roaming gateway of the authentication result by sending an authentication result message;

the step of the roaming gateway informing the ASN of the roaming area network of the access result comprises: the roaming gateway informing the ASN of the roaming area network of the access result by sending an access response message;

the step of the ASN of the roaming area network informing the roaming terminal of the attachment result comprises:
the ASN of the roaming area network informing the roaming terminal of the attachment result by sending an attachment response message.

6. The method according to claim 4, wherein,
the ASN of the roaming area network stores configuration information of an AID range of a local network, and the ASN of the roaming area network distinguishes a terminal of the local network from the roaming terminal according to the configuration information of the AID range of the local network;
the roaming gateway stores configuration information of the AID range of each network connected with the roaming gateway, and the roaming gateway distinguishes terminals of different networks according to the configuration information of the AID range of each network.

7. The method according to claim 1, wherein, the step of the ASN in the roaming area network sending subsequent data packets of the roaming terminal to the destination device according to the RID of the destination device comprises:
the ASN in the roaming area network re-encapsulating the data packet of the roaming terminal by using the RID of the destination device and the RID of the roaming terminal as the destination address and the source address of the re-encapsulated data packet respectively, and sending the re-encapsulated data packet to a destination ASN through a media plane channel between the ASN in the roaming area network and the destination ASN; and
the destination ASN de-encapsulating the received data packet re-encapsulated by the ASN in the roaming area network, restoring to the data packet of the roaming terminal and sending to the destination device.

8. The method according to claim 1, wherein, the step of the ASN in the roaming area network sending subsequent data packets of the roaming terminal to the destination device according to the RID of the destination device comprises:
the ASN in the roaming area network re-encapsulating the data packet of the roaming terminal by using the RID of the destination device and the RID of the roaming terminal as the destination address and the source address of the re-encapsulated data packet respectively, and sending the re-encapsulated data packet to the roaming gateway;
the roaming gateway sending the re-encapsulated data packet to the destination ASN according to the RID of the destination device; and
the destination ASN de-encapsulating the received data packet re-encapsulated by the ASN in the roaming area network, restoring to the data packet of the roaming terminal and sending to the destination device.

9. The method according to claim 1, wherein, the method further comprises:
when requesting to query the RID of the destination device to the roaming gateway, the ASN in the roaming area network further sending the first data packet to the roaming gateway;
when querying the RID of the destination device from the home network of the destination device, the roaming gateway further sending the first data packet to the home network of the destination device; and
after querying out the RID of the destination device, the home network of the destination device sending the first data packet to the destination ASN according to the queried RID.

10. A system for implementing inter-network roam, wherein, the system is applied in a network of access identifier and location identifier separation, in the network, an access identifier (AID) is used as a user identity identifier of a terminal and a routing identifier (RID) is used as a location identifier of the terminal, and the system comprises a roaming terminal, a destination device, an access service node (ASN) of a roaming area network, and a roaming gateway, wherein:
the roaming terminal is configured to, after attaching to the ASN of the roaming area network, send a first data packet to the destination device, wherein a destination address of the first data packet is an AID of the destination device;
the ASN of the roaming area network is configured to, after receiving the first data packet, locally query AID-RID mapping information, and request to query a RID of the destination device to the roaming gateway if the RID of the destination device is not found and the destination device does not belong to the roaming area network; and send subsequent data packets of the roaming terminal to the destination device according to the RID after receiving the RID of the destination device returned by the roaming gateway;
the roaming gateway is configured to, query the RID of the destination device from a home network of the destination device and return the RID of the destination device to the ASN in the roaming area network.

11. The system according to claim 10, wherein, the ASN of the roaming area network is configured to request to query the RID of the destination device to the roaming gateway in the following way: sending the AID of the destination device to the roaming gateway to request to query the RID of the destination device;
the roaming gateway is configured to,
after receiving the AID of the destination device, analyze the AID to acquire the home network of the destination device, and send the AID of the destination device to a mapping forwarding plane of the home network of the destination device to request to query the RID of the destination device;
receive and store AID-RID mapping information of the destination device queried by the mapping forwarding plane of the home network of the destination device according to the AID of the destination device, and forward the AID-RID mapping information to the ASN of the roaming area network.

12. The system according to claim 11, wherein,
the ASN of the roaming area network is configured to request to query the RID of the destination device by sending to the roaming gateway an AID-RID query message carrying the AID of the destination device;
the roaming gateway is configured to:
request to query the RID of the destination device by sending to the mapping forwarding plane of the home network of the destination device an AID-RID request message carrying the AID of the destination device;
receive an AID-RID request result message returned by the mapping forwarding plane of the home network of the destination device to acquire the AID-RID mapping information of the destination device; and
send the AID-RID mapping information of the destination device to the ASN of the roaming area network through sending an AID-RID query result message to the ASN of the roaming area network.

13. The system according to claim 10, wherein,
the roaming terminal is further configured to request attachment to the ASN of the roaming area network, and send the AID of the roaming terminal to the ASN of the roaming area network;

the ASN of the roaming area network is further configured to identify that the roaming terminal does not belong to a local network according to the AID of the roaming terminal, and request access to the roaming gateway; and receive an access result sent by the roaming gateway, and inform the roaming terminal of an attachment result;

the roaming gateway is further configured to search for a home network of the roaming terminal according to the AID of the roaming terminal, and request authentication to an authentication center of the home network of the roaming terminal; and, receive an authentication result sent by the authentication center, and inform the ASN of the roaming area network of the access result.

14. The system according to claim 13, wherein, the roaming terminal is configured to request attachment to the ASN of the roaming area network, and send the AID of the roaming terminal to the ASN of the roaming area network in the following way: requesting attachment to the ASN of the roaming area network by sending an attachment request message carrying the AID of the roaming terminal;

the ASN of the roaming area network is configured to: request access to the roaming gateway by sending an access request message; and inform the roaming terminal of the attachment result by sending an attachment response message;

the roaming gateway is configured to: request authentication to the authentication center of the home network of the roaming terminal by sending an authentication request message; receive an authentication result message sent by the authentication center; and inform the ASN of the roaming area network of the access result by sending an access response message.

15. The system according to claim 10, wherein, the ASN in the roaming area network is configured to send subsequent data packets of the roaming terminal to the destination device according to the RID of the destination device in the following way:

re-encapsulating the data packet of the roaming terminal by using the RID of the destination device and the RID of the roaming terminal as the destination address and the source address of the re-encapsulated data packet respectively, and sending the re-encapsulated data packet to a destination ASN through a media plane channel between the ASN in the roaming area network and the destination ASN;

the destination ASN de-encapsulating the received data packet re-encapsulated by the ASN in the roaming area network, restoring to the data packet of the roaming terminal and sending to the destination device.

16. The system according to claim 10, wherein, the ASN in the roaming area network is configured to send subsequent data packets of the roaming terminal to the destination device according to the RID of the destination device in the following way:

re-encapsulating the data packet of the roaming terminal by using the RID of the destination device and the RID of the roaming terminal as the destination address and the source address of the re-encapsulated data packet respectively, and sending the re-encapsulated data packet to the roaming gateway;

the roaming gateway sending the re-encapsulated data packet to the destination ASN according to the RID of the destination device;

the destination ASN de-encapsulating the received data packet re-encapsulated by the ASN in the roaming area network, restoring to the data packet of the roaming terminal and sending to the destination device.

17. The system according to claim 10, wherein, the ASN in the roaming area network is further configured to, when requesting to query the RID of the destination device to the roaming gateway, sending the first data packet to the roaming gateway;

the roaming gateway is further configured to, when querying the RID of the destination device from the home network of the destination device, send the first data packet to the home network of the destination device;

the home network of the destination device is further configured to, after querying out the RID of the destination device, send the first data packet to the destination ASN according to the queried RID.

18. A method for implementing inter-network roam, wherein, the method is applied in a network of access identifier and location identifier separation, in the network, an access identifier (AID) is used as a user identity identifier of a terminal and a routing identifier (RID) is used as a location identifier of the terminal, and the method comprises:

after attaching to an Access Service Node (ASN) of a roaming area network, a roaming terminal sending a first data packet to a destination device, wherein a destination address of the first data packet is the AID of the destination device;

after receiving the first data packet, the ASN in the roaming area network querying locally AID-RID mapping information, and requesting a local mapping forwarding plane to query the RID of the destination device if the RID of the destination device is not found and the destination device does not belong to the roaming area network;

the local mapping forwarding plane querying the RID of the destination device and returning to the ASN in the roaming area network; and according to the RID of the destination device, the ASN in the roaming area network sending subsequent data packets of the roaming terminal to the destination device;

when requesting the local mapping forwarding plane to query the RID of the destination device, the ASN in the roaming area network further sending the first data packet to the mapping forwarding plane;

after querying out the RID of the destination device, the local mapping forwarding plane sending the first data packet to the destination ASN according to the queried RID.

19. A system for implementing inter-network roam, wherein, the system is applied in a network of access identifier and location identifier separation, in the network, an access identifier (AID) is used as a user identity identifier of a terminal and a routing identifier (RID) is used as a location identifier of the terminal, and the system comprises a roaming terminal, a destination device, an access service node (ASN) of a roaming area network, and a local mapping forwarding plane, wherein:

the roaming terminal is configured to, after attaching to the ASN of the roaming area network, send a first data packet to the destination device, wherein a destination address of the first data packet is an AID of the destination device;

the ASN of the roaming area network is configured to, after receiving the first data packet, locally query AID-RID mapping information, and request the local mapping forwarding plane to query a RID of the destination device if the RID of the destination device is not found and the destination device does not belong to the roaming area network; and send subsequent data packets of the roaming terminal to the destination device according to the RID after receiving the RID of the destination device returned by the local mapping forwarding plane;

the local mapping forwarding plane is configured to query the RID of the destination device and return to the ASN in the roaming area network;

the ASN in the roaming area network is further configured to, when requesting the local mapping forwarding plane to query the RID of the destination device, send the first data packet to the mapping forwarding plane;

the local mapping forwarding plane is further configured to, after querying out the RID of the destination device, send the first data packet to the destination ASN according to the queried RID.

20. A querying method, wherein, the method is applied in a network of access identifier and location identifier separation, in the network, an access identifier (AID) is used as a user identity identifier of a terminal and a routing identifier (RID) is used as a location identifier of the terminal, and the method comprises:

an access service node (ASN) sending the AID of a device to a roaming gateway to request to query the RID of the device;

after receiving the AID of the device, the roaming gateway analyzing the AID to acquire a home network of the device, and sending the AID of the device to a mapping forwarding plane of the home network of the destination device to request to query the RID of the device; and after querying out a corresponding RID according to the AID of the device, the mapping forwarding plane of the home network of the device sending AID-RID mapping information of the device to the roaming gateway, and the roaming gateway storing the AID-RID mapping information and then forwarding to the ASN;

the step of the ASN sending the AID of the device to the roaming gateway to request to query the RID of the device comprises: the ASN requesting to query the RID of the device by sending to the roaming gateway an AID-RID query message carrying the AID of the device;

the step of the roaming gateway sending the AID of the device to the mapping forwarding plane of the home network of the device to request to query the RID of the device comprises: the roaming gateway requesting to query the RID of the device by sending to the mapping forwarding plane of the home network of the device an AID-RID request message carrying the AID of the device;

the step of the mapping forwarding plane of the home network of the device sending the AID-RID mapping information of the device to the roaming gateway comprises: the mapping forwarding plane of the home network of the device sending the AID-RID mapping information of the device to the roaming gateway through returning an AID-RID request result message to the roaming gateway;

the step of the roaming gateway forwarding the AID-RID mapping information of the device to the ASN comprises: the roaming gateway sending the AID-RID mapping information of the device to the ASN through sending an AID-RID query result message to the ASN.

21. A query system, wherein, the system is applied in a network of access identifier and location identifier separation, in the network, an access identifier (AID) is used as a user identity identifier of a terminal and a routing identifier (RID) is used as a location identifier of the terminal, and the system comprises an access service node (ASN), a roaming gateway, and a mapping forwarding plane of a home network of a device;

the ASN is configured to, send the AID of the device to the roaming gateway to request to query the RID of the device;

the roaming gateway is configured to, after receiving the AID of the device, analyze the AID to acquire the home network of the device, and send the AID of the device to the mapping forwarding plane of the home network of the device to request to query the RID of the device; and store and forward AID-RID mapping information to the ASN after receiving the AID-RID mapping information returned by the mapping forwarding plane of the home network of the device;

the mapping forwarding plane of the home network of the device is configured to, after querying out a corresponding RID according to the AID of the device, send the AID-RID mapping information of the device to the roaming gateway;

the ASN is configured to, request to query the RID of the device by sending to the roaming gateway an AID-RID query message carrying the AID of the device;

the roaming gateway is configured to, request to query the RID of the device by sending to the mapping forwarding plane of the home network of the device an AID-RID request message carrying the AID of the device; and send the AID-RID mapping information of the device to the ASN through sending an AID-RID query result message to the ASN;

the mapping forwarding plane of the home network of the device is configured to send the AID-RID mapping information of the device to the roaming gateway through returning an AID-RID request result message to the roaming gateway.

22. A method for network attachment, wherein, the method is applied in a network of access identifier and location identifier separation, in the network, an access identifier (AID) is used as a user identity identifier of a terminal and a routing identifier (RID) is used as a location identifier of the terminal, and the method comprises:

a roaming terminal requesting attachment to an access service node (ASN) of a roaming area network, and sending the AID of the roaming terminal to the ASN of the roaming area network;

the ASN of the roaming area network identifying that the roaming terminal does not belong to a local network according to the AID of the roaming terminal, and requesting access to a roaming gateway;

the roaming gateway searching for a home network of the roaming terminal according to the AID of the roaming terminal, and requesting authentication to an authentication center of the home network of the roaming terminal;

the authentication center informing the roaming gateway of an authentication result after authenticating the roaming terminal; and the roaming gateway informing the ASN of the roaming area network of an access result, and the ASN of the roaming area network informing the roaming terminal of an attachment result;

the step of the roaming terminal requesting attachment to the ASN of the roaming area network, and sending the AID of the roaming terminal to the ASN of the roaming area network comprises: the roaming terminal requesting attachment to the ASN of the roaming area network by sending an attachment request message carrying the AID of the roaming terminal;

the step of ASN of the roaming area network requesting access to the roaming gateway comprises: the ASN of the roaming area network requesting access to the roaming gateway by sending an access request message;

the step of the roaming gateway requesting authentication to the authentication center of the home network of the roaming terminal comprises: the roaming gateway requesting authentication to the authentication center of the home network of the roaming terminal by sending an authentication request message;

the step of the authentication center informing the roaming gateway of the authentication result comprises: the authentication center informing the roaming gateway of the authentication result by sending an authentication result message;

the step of the roaming gateway informing the ASN of the roaming area network of the access result comprises: the roaming gateway informing the ASN of the roaming area network of the access result by sending an access response message;

the step of the ASN of the roaming area network informing the roaming terminal of the attachment result comprises: the ASN of the roaming area network informing the roaming terminal of the attachment result by sending an attachment response message.

23. A system for network attachment, wherein, the system is applied in a network of access identifier and location identifier separation, in the network, an access identifier (AID) is used a the user identity identifier of a terminal and a routing identifier (RID) is used a the location identifier of the terminal, and the system comprises a roaming terminal, an access service node (ASN) of a roaming area network, a roaming gateway and an authentication center of a home network of the roaming terminal;

the roaming terminal is configured to request attachment to the ASN of the roaming area network, and send the AID of the roaming terminal to the ASN of the roaming area network;

the ASN of the roaming area network is configured to identify that the roaming terminal does not belong to a local network according to the AID of the roaming terminal, and request access to the roaming gateway; and inform the roaming terminal of an attachment result after receiving an access result returned by the roaming gateway;

the roaming gateway is configured to search for the home network of the roaming terminal according to the AID of the roaming terminal, and request authentication to the authentication center of the home network of the roaming terminal; and inform the ASN of the roaming area network of the access result after receiving an authentication result returned by the authentication center of the home network of the roaming terminal;

the authentication center of the home network of the roaming terminal is configured to authenticate the roaming terminal and then inform the roaming gateway of the authentication result;

the roaming terminal is configured to request attachment to the ASN of the roaming area network by sending an attachment request message carrying the AID of the roaming terminal;

the ASN of the roaming area network is configured to request access to the roaming gateway by sending an access request message; and inform the roaming terminal of the attachment result by sending an attachment response message;

the roaming gateway is configured to request authentication to the authentication center of the home network of the roaming terminal by sending an authentication request message; and inform the ASN of the roaming area network of the access result by sending an access response message;

the authentication center is configured to inform the roaming gateway of the authentication result by sending an authentication result message.

* * * * *

UNITED STATES PATENT AND TRADEMARK OFFICE
CERTIFICATE OF CORRECTION

PATENT NO.       : 8,665,849 B2  
APPLICATION NO.  : 13/395495  
DATED            : March 4, 2014  
INVENTOR(S)      : Youxing Jin et al.

Page 1 of 1

It is certified that error appears in the above-identified patent and that said Letters Patent is hereby corrected as shown below:

In the Claims:

Column 27, Line 30, Claim 23:

After "used" delete "a" and  
Insert -- as --.

Column 27, Line 31, Claim 23:

After "used" delete "a" and  
Insert -- as --.

Signed and Sealed this  
Tenth Day of June, 2014

Michelle K. Lee  
*Deputy Director of the United States Patent and Trademark Office*